(12) United States Patent
Shimasaki et al.

(10) Patent No.: US 10,488,987 B2
(45) Date of Patent: Nov. 26, 2019

(54) TOUCH PANEL APPARATUS

(71) Applicant: Mitsubishi Electric Corporation, Tokyo (JP)

(72) Inventors: Yusuke Shimasaki, Tokyo (JP); Seiichiro Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/785,037

(22) Filed: Oct. 16, 2017

(65) Prior Publication Data

US 2018/0113563 A1   Apr. 26, 2018

(30) Foreign Application Priority Data

Oct. 21, 2016 (JP) .................................. 2016-206999

(51) Int. Cl.
    *G06F 3/041* (2006.01)
    *G06F 3/044* (2006.01)

(52) U.S. Cl.
    CPC ............ *G06F 3/0418* (2013.01); *G06F 3/044* (2013.01); *G06F 2203/04111* (2013.01)

(58) Field of Classification Search
    CPC combination set(s) only.
    See application file for complete search history.

(56) References Cited

U.S. PATENT DOCUMENTS

| 8,633,905 | B2 | 1/2014 | Harada et al. |
| 9,069,424 | B2 | 6/2015 | Nagata |
| 9,250,740 | B2 | 2/2016 | Akai et al. |
| 9,285,937 | B2 | 3/2016 | Kida et al. |
| 2014/0092061 | A1* | 4/2014 | Akai ..................... G06F 3/0418 345/174 |
| 2015/0169108 | A1* | 6/2015 | Ishii ..................... G06F 3/0418 345/174 |
| 2015/0185956 | A1 | 7/2015 | Takayama et al. |
| 2016/0085363 | A1 | 3/2016 | Azumi et al. |
| 2017/0046007 | A1* | 2/2017 | Kitagawa ................ G06F 3/041 |

FOREIGN PATENT DOCUMENTS

| JP | 2008-134836 A | 6/2008 |
| JP | 2011-008725 A | 1/2011 |
| JP | 2013-029950 A | 2/2013 |
| JP | 2013-065212 A | 4/2013 |

(Continued)

*Primary Examiner* — Temesghen Ghebretinsae
*Assistant Examiner* — Sosina Abebe
(74) *Attorney, Agent, or Firm* — Studebaker & Brackett PC

(57) ABSTRACT

A touch panel apparatus includes: a data determination part determining whether a measurement value of a capacitance for each of a plurality of drive pulses measured by a sensing part is normal or abnormal; and a coordinate detection part outputting a touch coordinate position of a touch performed by an indication body in accordance with the measurement value of the capacitance which is determined to be normal by the data determination part, wherein the drive part changes a frequency of a drive pulse in the plurality of drive pulses corresponding to the measurement value of the capacitance which is determined to be abnormal by the data determination part, and outputs, in a subsequent scan, a plurality of drive pulses including a drive pulse whose frequency has been changed.

3 Claims, 3 Drawing Sheets

(56) References Cited

FOREIGN PATENT DOCUMENTS

| | | |
|---|---|---|
| JP | 2014-041555 A | 3/2014 |
| JP | 2014-071626 A | 4/2014 |
| JP | 2014-132445 A | 7/2014 |
| JP | 2015-056151 A | 3/2015 |
| JP | 2015-114872 A | 6/2015 |
| JP | 2015-153375 A | 8/2015 |
| JP | 2016-061934 A | 4/2016 |
| WO | 2007/130771 A2 | 11/2007 |

* cited by examiner

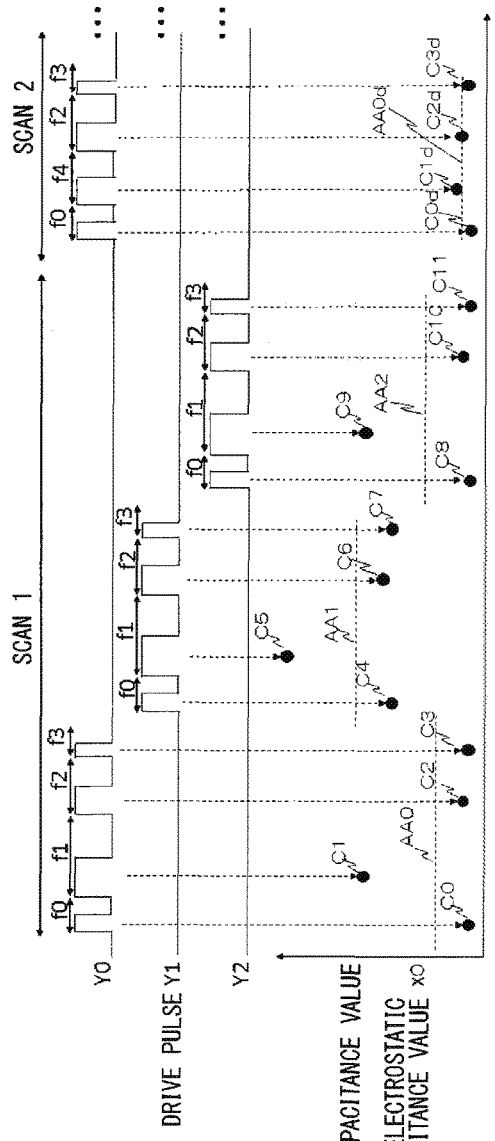
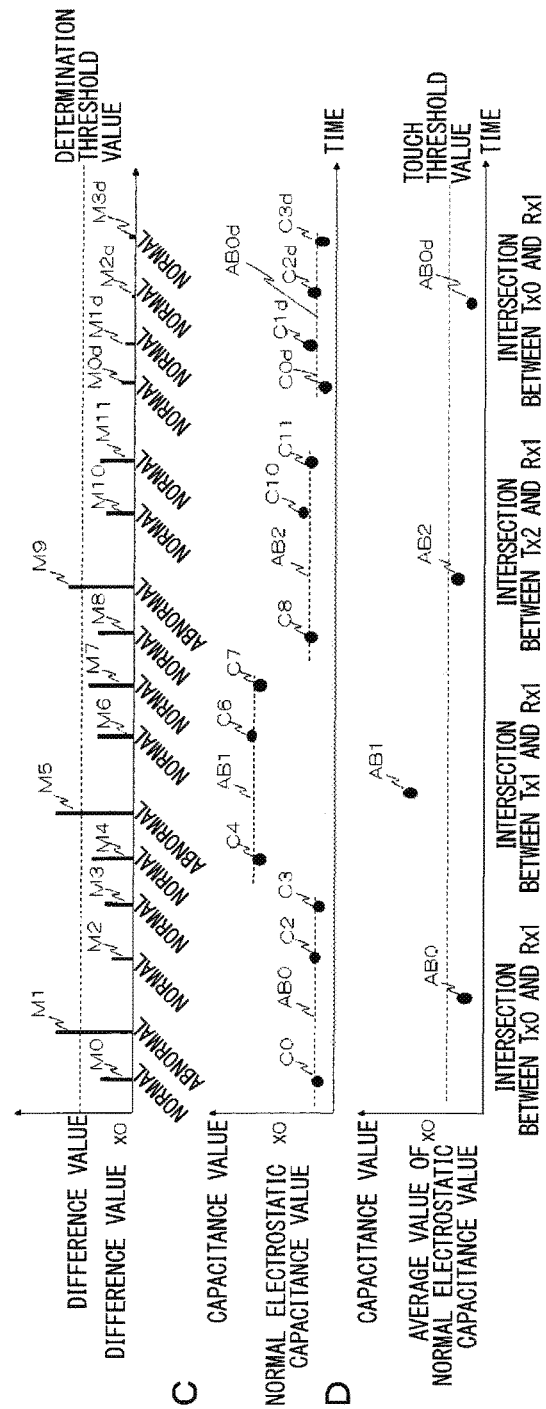

TOUCH PANEL APPARATUS

BACKGROUND OF THE INVENTION

Field of the Invention

The present invention relates to a touch panel apparatus, and can be preferably used in an information processing device with a touch input function using a touch panel.

Description of the Background Art

A touch panel which detects a touch performed by an indication body such as a finger to specify its position coordinate is mounted on a display apparatus, thereby attracting attention as one of remarkable user interface means as an alternative to a mechanical keyboard or mouse of the information processing device, and a touch panel in various forms such as a resistance film type or a capacitance type is commercialized.

These various forms includes, as one of the capacitance types, a projected capacitive touchscreen type (referred to as the PCT type hereinafter) which enables a detection of the touch performed by the indication body even when a front surface side of a touch sensor panel having a plurality of built-in sensor electrodes is covered by a protection plate such as a glass plate having a thickness of approximately several millimeters. This type has advantages that it is tough because the protection plate can be disposed on the front surface and has a long life because it has no operation part. Since these advantages are recognized, the PCT type touch panel is mounted on an image display apparatus, and is used for various purposes of touch input device such as an input part of a mobile communication equipment, an ATM in a financial institution, a car navigation device (Japanese Patent Application Laid-Open No. 2008434836).

The touch panel receives a disturbance noise caused by an inverter or switching power supply of a fluorescent light, and an incorrect operation such as a variation in a touch coordinate thereby occurs in some cases. Such an incorrect operation occurs when a frequency of the disturbance noise and a drive frequency of the touch panel interfere with each other, however, the frequency of the disturbance noise is often unknown, so that it is difficult to adjust the drive frequency of the touch panel to address the incorrect operation in advance. Disclosed is a technique of dynamically changing the drive frequency of the touch panel to automatically prevent the interference with the disturbance noise (Japanese Patent Application Laid-Open No. 2015-056151).

Also disclosed is a technique of inputting a plurality of drive pulses having different pulse widths to a touch panel and calculating a coordinate from a measurement result of capacitance using each drive pulse to suppress an incorrect operation due to the disturbance noise (Japanese Patent Application Laid-Open No. 2014-071626).

However, the method of Japanese Patent Application Laid-Open No. 2015-056151 has a problem that the incorrect operation may occur under the influence of the disturbance noise until the change of the drive frequency of the touch panel is completed. The method of Japanese Patent Application Laid-Open No. 2015-056151 also has a problem that when the frequency of the disturbance noise fluctuates, the drive frequency which is dynamically changed and the frequency of the fluctuated disturbance noise interfere with each other, thereby causing the incorrect operation.

Japanese Patent Application Laid-Open No. 2014-071626 suppresses the incorrect operation due to the disturbance noise by calculating the coordinate from a result of an averaging procedure of all of measured electrostatic capacitance values or performing a scan of outputting a plurality of drive pulses having the same pulse width to calculate the touch coordinate several times, changing the pulse width in each scan to obtain the touch coordinate, and using the scan result having the smallest number of touch coordinates. However, there is a problem that the former method performs the averaging procedure including the electrostatic capacitance value using the drive pulse interfering with the disturbance noise, thus it is difficult to completely exclude the influence of the disturbance noise, and the latter method performs the scan several times until the coordinate is determined, thus when a total number of indication bodies increases halfway through the procedure, the disturbance noise is hardly distinguished.

SUMMARY

It is an object of the present invention to provide a touch panel apparatus which can be normally operated even during a dynamic change of a drive frequency of a touch panel for preventing interference with a disturbance noise, and can suppress an incorrect operation even in a case where a frequency of the disturbance noise fluctuates.

A touch panel apparatus according to the present invention includes a touch sensor panel, a drive part, a sensing part, a determination part, and a coordinate detection part.

The touch sensor panel includes a plurality of sensors, the drive part is connected to the touch sensor panel and outputs a plurality of drive pulses having different frequencies during a scan of the touch sensor panel, and the sensing part is connected to the touch sensor panel and measures a capacitance for each of the plurality of drive pulses.

The data determination part determines whether a measurement value of the capacitance for each of the plurality of drive pulses measured by the sensing part is normal or abnormal, and the coordinate detection part outputs a touch coordinate position of a touch performed by an indication body in accordance with the measurement value of the capacitance which is determined to be normal by the data determination part.

The drive part changes a frequency of a drive pulse in the plurality of drive pulses corresponding to the measurement value of the capacitance which is determined to be abnormal by the data determination part, and outputs, in a subsequent scan, a plurality of drive pulses including a drive pulse whose frequency has been changed.

Even when some of the drive pulses interferes with the disturbance noise or the frequency of the disturbance noise fluctuates, the touch panel apparatus according to the present invention detects the coordinate using an electrostatic capacitance value measured by a drive pulse having the frequency which does not interfere with the disturbance noise, thus an incorrect operation due to the disturbance noise can be constantly suppressed, and the touch panel apparatus can be normally operated even during the change of the frequency of the drive pulse.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3D are diagrams illustrating an operation example of a drive part, a sensing part, a data determination part, and a coordinate detection part of the touch panel apparatus according to the embodiment 1 of the present invention.

DESCRIPTION OF THE PREFERRED EMBODIMENTS

Figure 1:
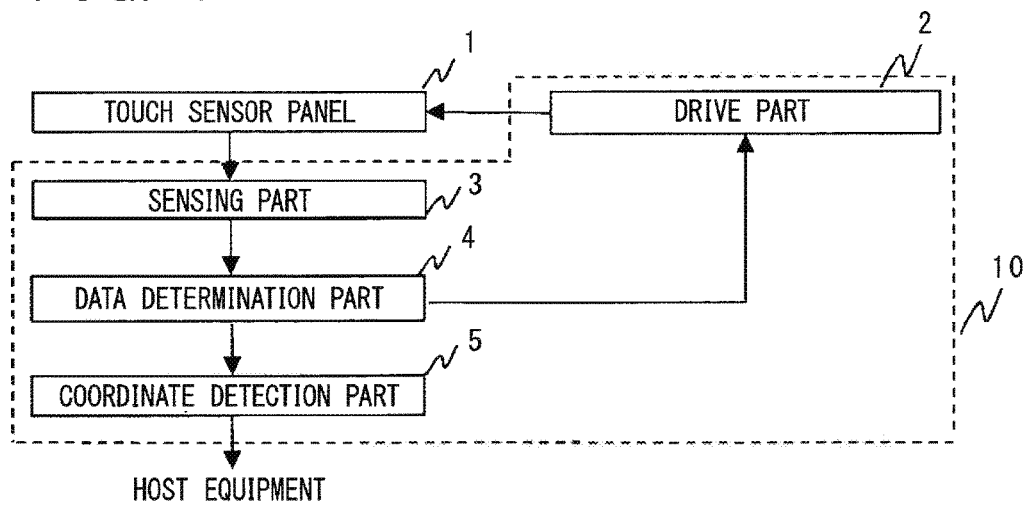
FIG. 1 is a schematic configuration diagram of a touch panel apparatus according to an embodiment 1 of the present invention.

Embodiments of the present invention are described with reference to the drawings hereinafter. In order to prevent an overlapping and redundant description, the same reference numerals as those described in each drawing will be assigned to an element having the same or corresponding function.

Embodiment 1

FIG. 1 is a schematic configuration diagram of a touch panel apparatus according to the embodiment 1 of the present invention. The touch panel apparatus illustrated in FIG. 1 includes a touch sensor panel 1 made up of (including) a plurality of sensors, a drive part 2 connected to the touch sensor panel 1 to output a plurality of drive pulses having different frequencies for measuring a capacitance, a sensing part 3 connected to a sensor constituting the touch sensor panel 1 to measure the capacitance for each of the plurality of drive pulses being output from the drive part 2, a data determination part 4 determining whether a measurement result of the capacitance for each of the plurality of drive pulses measured by the sensing part 3 is normal or abnormal, and a coordinate detection part 5 outputting a touch coordinate position of a touch performed by an indication body 11 in accordance with the measurement result of the capacitance which is determined to be normal by the data determination part 4 to a host equipment (not shown).

In FIG. 1, in addition to a function of outputting the drive pulse having a certain frequency to the touch sensor panel 1 a predetermined number of times to measure the capacitance, the drive part 2 has a function of outputting the plurality of drive pulses having the different frequencies to the touch sensor panel 1 and controlling the frequencies of the drive pulses. The drive part 2 further has a function of storing the frequency of the drive pulse, whose electrostatic capacitance value measured by the sensing part 3 is determined to be abnormal by the data determination part 4, as a non-used frequency.

Figure 2:
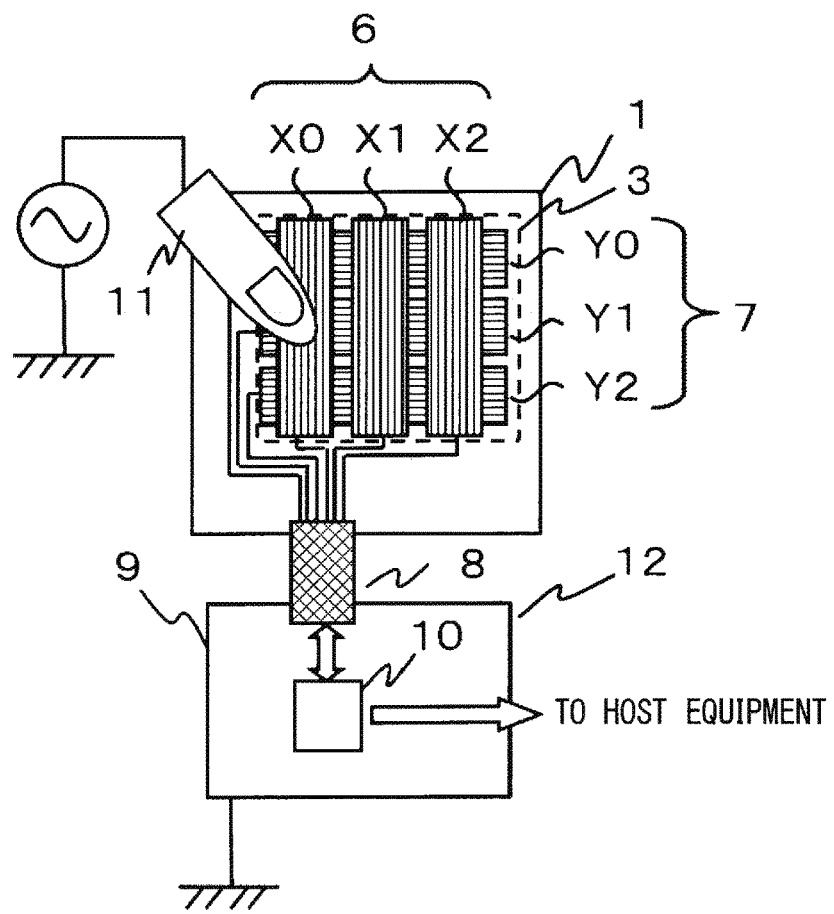
FIG. 2 is a diagram illustrating a configuration of a touch sensor panel and a touch panel controller illustrated in FIG. 1.

FIG. 2 illustrates an example of a configuration of the touch sensor panel 1 and a touch panel control circuit 10 illustrated in FIG. 1. In FIG. 2, the sensing part 3 of the touch sensor panel 1 includes an X sensor group 6 extending in a vertical direction and disposed in a horizontal direction and a Y sensor group 7 extending in a horizontal direction and disposed in a vertical direction. Each X sensor and Y sensor in the X sensor group 6 and the Y sensor group 7 intersect with an insulating film therebetween, and each intersection part forms capacitance to detect a touch.

A control substrate 9 includes the touch panel control circuit 10, a peripheral circuit (not shown), and a power source (not shown) supplying them with power. The touch panel control circuit 10 is a semiconductor integrated circuit (IC) incorporating functions of the drive part 2, the sensing part 3, the data determination part 4, and the coordinate detection part 5. The X sensor group 6 and Y sensor group 7 of the touch sensor panel 1 are connected to a plurality of capacitive detection terminals and sensor drive terminals of the touch panel control circuit 10, respectively, via a lead wire and a flexible printed circuit (FPC) 8, for example, in the touch sensor panel 1.

The control substrate 9 is connected to the host equipment via a connector or a cable (not shown), for example, to transmit information regarding a touch position in the touch sensor panel 1 and a touch to the host equipment using a communication means such as a universal serial bus (USB), an I2C, a universal asynchronous receiver transmitter (UART).

The sensing part 3 has a sufficient processing capacity, thereby being capable of measuring the capacitance on all of the sensors of the X sensor group 6 or the Y sensor group 7 at the same time. Herein, in order to simplify the description, the number of sensors included in each of the X sensor group 6 and the Y sensor group 7 is defined as three, and the sensors are referred to as X0, X1, X2, Y0, Y1, and Y2, respectively, thus nine intersection parts are formed. FIG. 2 illustrates the indication body 11 touching the intersection part between the sensor X0 and the sensor Y1, and a disturbance noise is input to the touch panel apparatus via the indication body 11.

Next, FIGS. 3A to 3D illustrate a drive output waveform of the drive part 2 of the touch panel apparatus and an operation example of the sensing part 3, the data determination part 4, and the coordinate detection part 5 in accordance with the drive output waveform. Described herein is a case where the drive part 2 outputs the drive pulse having four frequencies (f0 to f3) in order to simplify the description.

Figure 4:
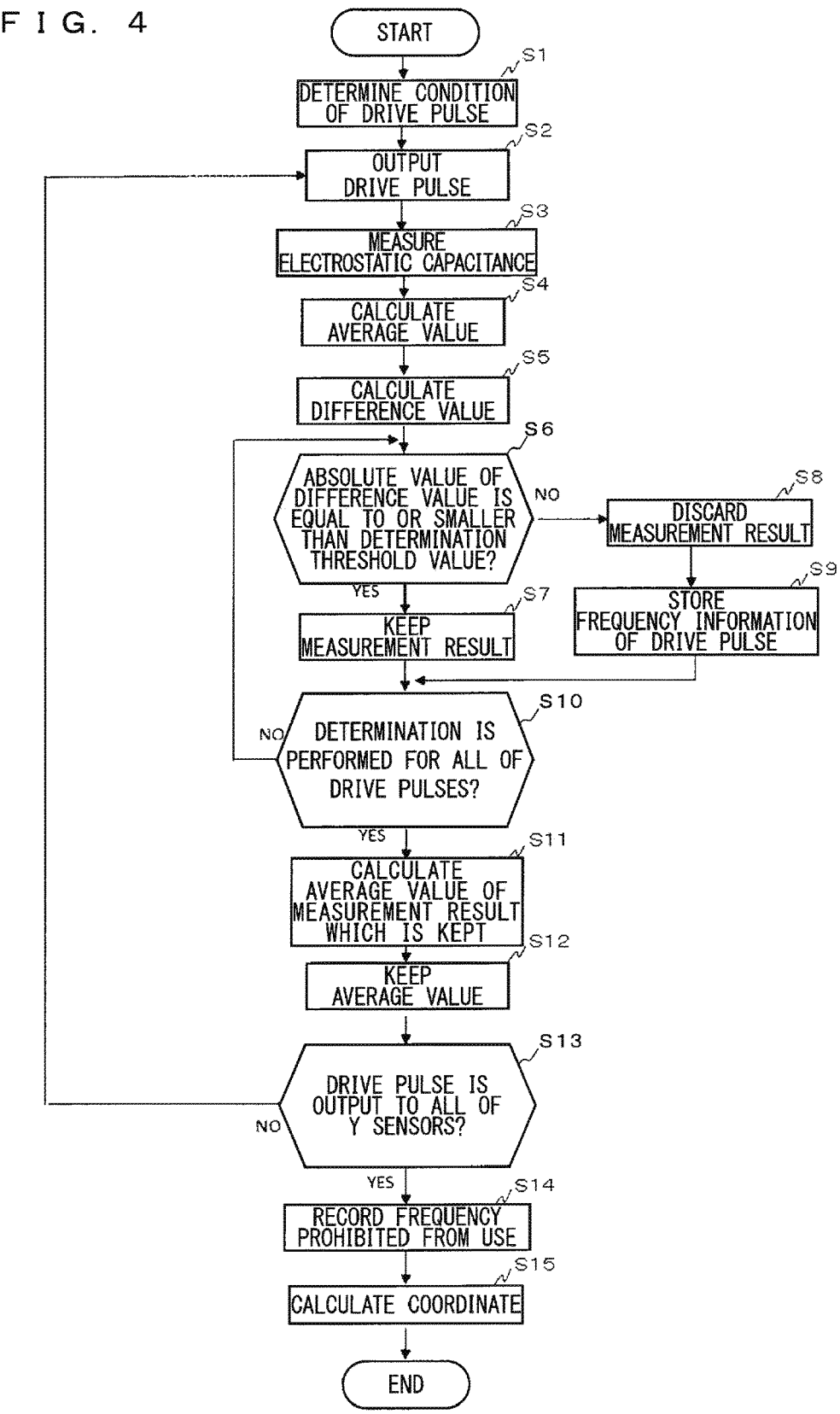
FIG. 4 is a flow chart illustrating the operation of the touch panel apparatus according to the embodiment 1 of the present invention.

FIG. 4 is a flow chart illustrating one processing operation of the touch panel apparatus according to the embodiment 1 of the present invention, and steps illustrated in FIG. 4 are performed repeatedly at a fixed time interval. One whole processing in FIG. 4 is described as a scan in FIGS. 3A to 3D.

In FIG. 3A, each of the signs f0 to f3 additionally assigned to an upper part of the drive pulse waveforms Y0 to Y2 expresses the frequency of the drive pulse which the drive part 2 outputs to each Y sensor of the touch sensor panel 1 in a first scan (referred to as a scan 1 hereinafter). Four black-dot positions illustrated by signs C0 to C3 express electrostatic capacitance values at the intersection part between the sensor X0 and the sensor Y0 measured by the sensing part 3 using the drive pulse having frequencies f0 to f3. Similarly, four black-dot positions illustrated by signs C4 to C7 express electrostatic capacitance values at the intersection part between the sensor X0 and the sensor Y1, and four black-dot positions illustrated by signs C8 to C11 express electrostatic capacitance values at the intersection part between the sensor X0 and the sensor Y2.

A sign AA0 indicates an average value of the electrostatic capacitance values C0 to C3, and similarly, signs AA1 and AA2 indicate averages values of the electrostatic capacitance values C4 to C7 and the electrostatic capacitance values C8 to C11, respectively.

A sign f4 assigned in a second scan (referred to as a scan 2 hereinafter) indicates a frequency changed from the frequency f1 of the drive pulse used for measuring the electrostatic capacitance value C1, which is determined to be abnormal by the data determination part 4, in the scan 1 by the drive part 2. Signs C0d to C3d express electrostatic capacitance values at the intersection part between the sensor X0 and the sensor Y0 measured by the sensing part 3 using the drive pulse having frequencies f0, f4, f2, and f3. A sign AA0d is an average value of the electrostatic capacitance values C0d to C3d.

In FIG. 3B, each of signs M0 to M3 indicates an absolute value of a difference value between the electrostatic capacitance values C0 to C3 and the average value AA0, each of signs M4 to M7 indicates an absolute value of a difference value between the electrostatic capacitance values C4 to C7 and the average value AA1, and each of signs M8 to M11 indicates an absolute value of a difference value between the electrostatic capacitance values C8 to C11 and the average value AA2. Each of signs M0d to M3d indicates an absolute value of a difference value between the electrostatic capacitance values C0d to c3d and the average value AA0d.

In FIG. 3C, a sign AB0 indicates an average value of the electrostatic capacitance values C0, C2, and C3 which are determined to be normal by the data determination part 4, a sign AB1 is an average value of the electrostatic capacitance values C4, C6, and C7, and a sign AB2 is an average value of the electrostatic capacitance values C8, C10, and C11.

A sign AB0d indicates an average value of the electrostatic capacitance values C0d, C1d, C2d, and C3d which are determined to be normal by the data determination part 4.

FIG. 3D is a drawing illustrating a relationship between the average values AB0, AB1, AB2, and AB0d of the electrostatic capacitance value described above and a touch threshold value.

Next, the operation of the touch panel apparatus is described in detail using FIG. 4. Firstly, the drive part 2 determines the number of drive pulses being output to the Y sensor group of the touch sensor panel 1 and the frequency of each drive pulse (Step S1), and outputs the drive pulse with a condition determined in Step S1 to the sensor Y0 of the touch sensor panel 1 (Step S2).

Furthermore, as illustrated in FIG. 3A, the sensing part 3 measures the electrostatic capacitance values C0 to C3 at the intersection part between the sensor Y0 and the sensor X0 (referred to as the intersection part hereinafter) for each drive pulse, and then outputs the electrostatic capacitance values C0 to C3 to the data determination part 4 (Step S3).

The data determination part 4 obtains the average value AA0 of the electrostatic capacitance values C0 to C3 (Step S4), calculates each of the absolute values M0 to M3 of the difference values between the average value AA0 and each of the electrostatic capacitance values C0 to C3 (referred to as the difference value hereinafter) (Step S5), and compares each difference value with a predetermined threshold value (referred to as the determination threshold value hereinafter), thereby determining whether the electrostatic capacitance value used for calculating the difference value is normal or abnormal (Step S6).

For example, in a case of FIG. 3B, the difference value M0 is equal to or smaller than the determination threshold value, thus the data determination part 4 determines that the electrostatic capacitance value C0 used for calculating the difference value M0 is the normal electrostatic capacitance value, and keeps the electrostatic capacitance value C0 (Step S7).

In the meanwhile, since the difference value M1 is larger than the determination threshold value, the data determination part 4 determines that the electrostatic capacitance value C1 used for calculating the difference value M1 is the abnormal electrostatic capacitance value, discards the electrostatic capacitance value C1 (Step S8), and outputs the information of the frequency f1 of the drive pulse used for measuring the electrostatic capacitance value C1 to the drive part 2, and the drive part 2 stores the frequency (Step S9).

When the data determination part 4 determines in Step S10 that the determination in Step S6 is completed for all of the difference values, the processing proceeds to Step S11, and the data determination part 4 calculates the average value of the electrostatic capacitance values kept in Step S7, and keeps the calculated average value (Step S12).

For example, in a case of FIG. 3C, the data determination part 4 keeps the average value AB0 of the electrostatic capacitance values C0, C2, and C3. The processing from Step S2 to Step S12 described above is repeated until the drive part 2 finishes outputting the drive pulse to all of the Y sensors (in the example of FIG. 3C, the sensor Y0 to the sensor Y2) (Step S13).

When the drive part 2 finishes outputting the drive pulse to all of the Y sensors, the processing proceeds to Step S14, and the drive part 2 records the appropriate frequency of the drive pulse as a frequency prohibited from use from the frequency information stored in Step S9.

In the scan other than the first scan, the drive part 2 selects the frequency except for the frequency prohibited from use recorded in the previous scan.

For example, in a case of FIG. 3A, the drive part 2 determines the frequency f1 of the drive pulse in which the abnormal electrostatic capacitance value is measured in the scan 1 to be the frequency prohibited from use, and adds the drive pulse of the new frequency f4 to the drive pulse of the frequencies f0, f2, and f3 except for the frequency f1 in the scan 2 to output the drive pulse to the sensor Y0.

Since it is generally known that a frequency which is an integral multiple of the frequency interfering with the disturbance noise also interferes with the disturbance noise, the frequency f4 herein has a value other than the integral multiple of the frequency f1.

As illustrated in FIG. 3D, in a final Step S15, the coordinate detection part 5 compares the average values AB0 to AB2 kept in Step S12 with the predetermined touch threshold value to determine whether or not a touch is performed by the indication body 11 and calculate the touch coordinate, and calculates the coordinate to output the touch coordinate to the host equipment when the touch is performed by the indication body 11, and the processing in FIG. 4 is finished.

In the example of FIG. 3D, the average value AB1 of the electrostatic capacitance value is larger than the touch threshold value, thus it can be determined that the indication body 11 touches the intersection part between the sensor Y1 and the sensor X0. In the meanwhile, since the electrostatic capacitance values C1, C5, and C9 corresponding to the frequency 11 also in the scan 1 in the first measurement is determined to be abnormal, they are not used for calculating the average values AB0 to AB2 of the electrostatic capacitance values, thus the influence of the noise can be eliminated from the touch detection. Since the frequency f4 is used instead of the frequency f1 after the scan 2, the average values AB0d to AB2d of the electrostatic capacitance values which are not influenced by the noise can be obtained, thus the touch detection can be performed with a higher degree of accuracy.

As described above, according to the embodiment 1, even when the measurement result of the capacitance using some of drive pulses interfering with the disturbance noise indicates the abnormal value, the abnormal electrostatic capacitance value is discarded and the coordinate can be calculated from the other normal electrostatic capacitance value, thus the incorrect operation due to the disturbance noise can be suppressed.

The touch panel apparatus can be normally operated without the influence of the disturbance noise even during the change of the frequency of the drive pulse interfering with the disturbance noise.

In the embodiment 1 described above, the number of sensors included in each of the X sensor group 6 and the Y sensor group 7 is defined as three to simplify the description. However, as long as the sensing part 3 and the touch panel control circuit 10 have the sufficient processing capacity, thereby being capable of measuring the capacitance on all of the sensors of the X sensor group 6 or the Y sensor group 7 at the same time, the number of sensors included in each of the X sensor group 6 and the Y sensor group 7 is not limited to three, thus the number of sensors can be increased to obtain the highly accurate touch position detection capacity.

Although the above embodiment 1 describes the case where the driving part 2 outputs the four drive pulses to simplify the description, the number of drive pulses for driving one sensor in one scan is not limited to four, but the drive part 2 and the data determination part 4 may have a configuration of continuously outputting the five or more drive pulses having the different frequencies.

Modification Example 1

In the above embodiment 1, the data determination part 4 determines whether the electrostatic capacitance value is normal or abnormal using the average value of the electrostatic capacitance values measured by the sensing part 3, however, any method is applicable as long as it can determine the variation of the electrostatic capacitance value due to the disturbance noise, thus a median value obtained by arranging the measurement values in order and adopting a medium value, for example, may also be used. In the above case, when the variation in the plurality of electrostatic capacitance values occurs due to the interference with the disturbance noise, there is a probability that it can be determined whether the electrostatic capacitance value is normal or abnormal more accurately than the method of obtaining the average value including the abnormal value influenced by the noise.

For example, in FIG. 3A, when the electrostatic capacitance values C0 to C3 obtained corresponding to the drive pulse of the sensor Y0 are arranged in ascending order of value, the electrostatic capacitance values are arranged as C0, C3, C2, and C1, and the medium value (the median value) takes an average value of the electrostatic capacitance values C3 and C2, that is, $(C3+C2)/2$.

Similarly, the electrostatic capacitance values C4 to C7 arranged in ascending order of value are C4, C7, C6, and C5, and the medium value (the median value) takes an average value of the electrostatic capacitance values C7 and C6, that is, $(C6+C7)/2$. The electrostatic capacitance values C8 to C11 arranged in ascending order of value are C8, C11, C10, and C9, and the medium value (the median value) takes an average value of the electrostatic capacitance values C10 and C11, that is, $(C10+C11)/2$.

As described above, the influence of the abnormal values C1, C5, and C9 influenced by the noise can be eliminated from the medium value, and a comparison of the difference value between the medium values and each electrostatic capacitance value with the predetermined determination threshold value enables the accurate determination of the abnormal value of the measurement value of the capacitance influenced by the noise.

Modification Example 2

The measurement value may be corrected in accordance with the frequency to enhance the accuracy of the normal data determination and the coordinate detection in the capacitance measurement. For example, when a signal in which the drive pulse being output to the sensors Y0 to Y2 is excited in the sensors X0 to X2 via the capacitance of each intersection part is amplified by an amplifier, which has a frequency characteristic, to measure each electrostatic capacitance value, the electrostatic capacitance value may be corrected so as to compensate for the frequency characteristic of the amplifier in accordance with the frequencies f0 to f4 of the drive pulse being output to the sensors Y0 to Y2.

Embodiment 2

The embodiment 1 described above has the configuration that the drive part 2 firstly outputs the drive pulse having the four different predetermined frequencies f0, f1, f2, and f3 at the time of the first scan to select the frequency f1 of the drive pulse corresponding to the abnormal electrostatic capacitance value influenced by the noise, and uses the other frequency f4 instead of the frequency f1 at the time of the subsequent scan, in order to simplify the description.

In the meanwhile, the present embodiment has a configuration that the drive pulses having ten types of the different frequencies f4 to f13 are prepared as an alternative frequency to the frequency of the drive pulse corresponding to the abnormal electrostatic capacitance value influenced by the noise, and an operation of switching the drive pulse to the drive pulse having the ten types of frequencies is performed in the drive part 2 every time the abnormal electrostatic capacitance value influenced by the noise occurs. The detail is described hereinafter. Since the configuration other than the drive part 2 is similar to that of the embodiment 1 described above, the detailed description is omitted herein.

That is to say, when the abnormal electrostatic capacitance value occurs in the frequency f4, the frequency f4 is determined to be the frequency prohibited from use in the next scan, and it is determined whether the abnormal electrostatic capacitance value does not occur in the frequency f5 instead of the frequency f4. When the abnormal electrostatic capacitance value does not occur, the frequency is fixed to the frequency f5. When the abnormal electrostatic capacitance value occurs, the frequency f5 is determined to be the frequency prohibited from use, and it is determined whether the abnormal electrostatic capacitance value does not occur in the frequency f6 instead of the frequency f5. The above processing is subsequently repeated, and when the abnormal electrostatic capacitance value occurs, the frequencies f5, f6, f7, f8, f9 . . . f12, and f13 are recorded as the frequencies prohibited from use and the frequency is switched in this order, and when it is determined that the abnormal electrostatic capacitance value does not occur, the frequency at the time of the subsequent scan is fixed to the frequency determined to be normal.

In the meanwhile, when the abnormal electrostatic capacitance value still occurs even after the frequency is switched to the frequency f13 and there is no more frequency which can be set in determining the condition of the drive pulse, the drive pulse 2 selects the frequency which has been recorded earliest in the frequencies prohibited from use which have been switched previously, excludes the selected frequency from the frequency prohibited from use, and outputs the drive pulse having the selected frequency. The frequency which has been recorded earliest in the above case is the frequency f4. The above processing is repeated subsequently.

As described above, the switching of the frequency is repeated in a manner of the frequencies f4, f5, f6, f7, f8, f9 . . . f12, f13, f4, f5 . . . in this order, thus the probability of finding the frequency of the drive pulse which is not influenced by the noise is increased.

The embodiments 1 and 2 described above describe the configuration that the drive part 2 switches "the frequency" of the drive pulse influenced by the noise as a feature of the waveform of the drive pulse for driving the sensing part 3, however, it is obvious that the invention of the present application can be similarly implemented even when "the frequency" of the drive pulse is replaced by "a cycle" of the drive pulse or "a pulse width" of the drive pulse.

While the invention has been shown and described in detail, the foregoing description is in all aspects illustrative and not restrictive. It is therefore understood that numerous modifications and variations can be devised without departing from the scope of the invention.

What is claimed is:

1. A touch panel apparatus, comprising:
a touch sensor panel including a plurality of sensors;
a drive part connected to said touch sensor panel to output a plurality of drive pulses having different frequencies during a scan of said touch sensor panel;
a sensing part connected to said touch sensor panel to measure a capacitance for each of said plurality of drive pulses, said plurality of drive pulses being output to the same scan part in said sensing part;
a data determination part determining whether a measurement value of said capacitance for each of said plurality of drive pulses measured by said sensing part is normal or abnormal; and
a coordinate detection part outputting a touch coordinate position of a touch performed by an indication body in accordance with the measurement value of said capacitance which is determined to be normal by said data determination part, wherein
said drive part changes a frequency of a drive pulse in said plurality of drive pulses corresponding to the measurement value of said capacitance which is determined to be abnormal by said data determination part, and outputs, in a subsequent scan, a plurality of drive pulses including a drive pulse whose frequency has been changed, and
said drive part changes a frequency of a drive pulse corresponding to the measurement value of said capacitance which is determined to be abnormal by said data determination part to a frequency other than a frequency which is an integral multiple of an initial frequency, and outputs, in a subsequent scan, a plurality of drive pulses including a drive pulse whose frequency has been changed.

2. The touch panel apparatus according to claim 1, wherein:
said data determination part obtains an average value or a median value of a plurality of measurement values of said capacitance for said plurality of drive pulses measured by said sensing part, and when a difference value between said average value or said median value and a measurement value of said capacitance in said plurality of measurement values falls within a predetermined range, said data determination part determines that the measurement value of said capacitance is normal, and
said data determination part determines that a measurement value of said capacitance in said plurality of measurement values which does not fall within said predetermined range is abnormal.

3. A touch panel apparatus, comprising:
a touch sensor panel including a plurality of sensors;
a drive part connected to said touch sensor panel to output a plurality of drive pulses having different frequencies during a scan of said touch sensor panel;
a sensing part connected to said touch sensor panel to measure a capacitance for each of said plurality of drive pulses, said plurality of drive pulses being output to the same scan part in said sensing part;
a data determination part determining whether a measurement value of said capacitance for each of said plurality of drive pulses measured by said sensing part is normal or abnormal; and
a coordinate detection part outputting a touch coordinate position of a touch performed by an indication body in accordance with the measurement value of said capacitance which is determined to be normal by said data determination part, wherein
said drive part changes a frequency of a drive pulse in said plurality of drive pulses corresponding to the measurement value of said capacitance which is determined to be abnormal by said data determination part, and outputs, in a subsequent scan, a plurality of drive pulses including a drive pulse whose frequency has been changed,
said drive part changes a frequency of a drive pulse corresponding to the measurement value of said capacitance which is determined to be abnormal by said data determination part, and stores a frequency before changed as a frequency prohibited from use, and
when there is no more frequency which can be changed and also is not prohibited from use, said drive part excludes a frequency, which has been determined to be prohibited from use earliest in frequencies prohibited from use, from frequencies prohibited from use and uses said frequency.

* * * * *